June 10, 1947.     A. V. BEDFORD     2,422,068
PULSE ECHO CONTROL SYSTEM
Filed April 1, 1942     2 Sheets-Sheet 2
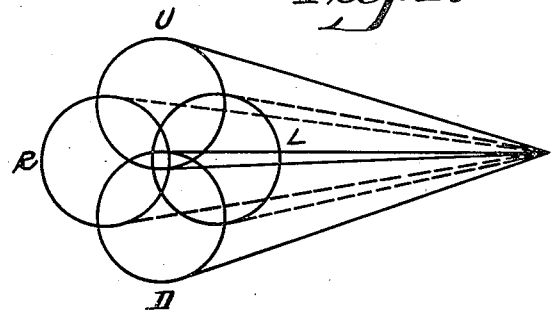
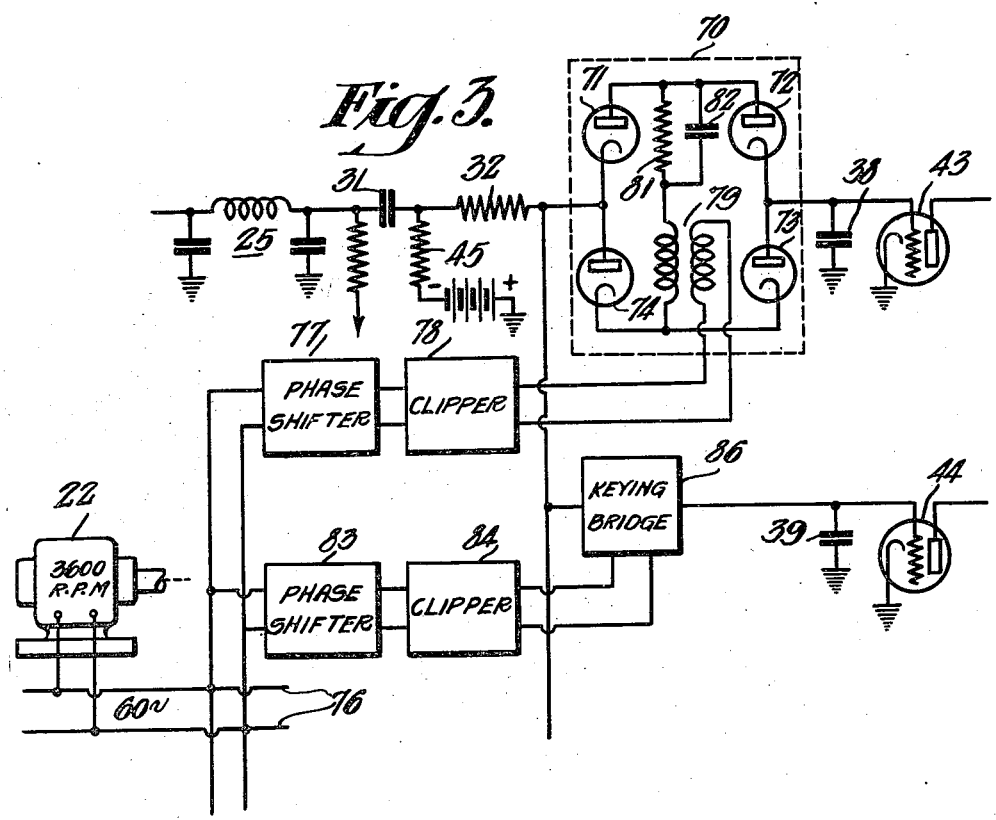
Inventor
Alda V. Bedford
By C. D. Tuska
Attorney Patented June 10, 1947

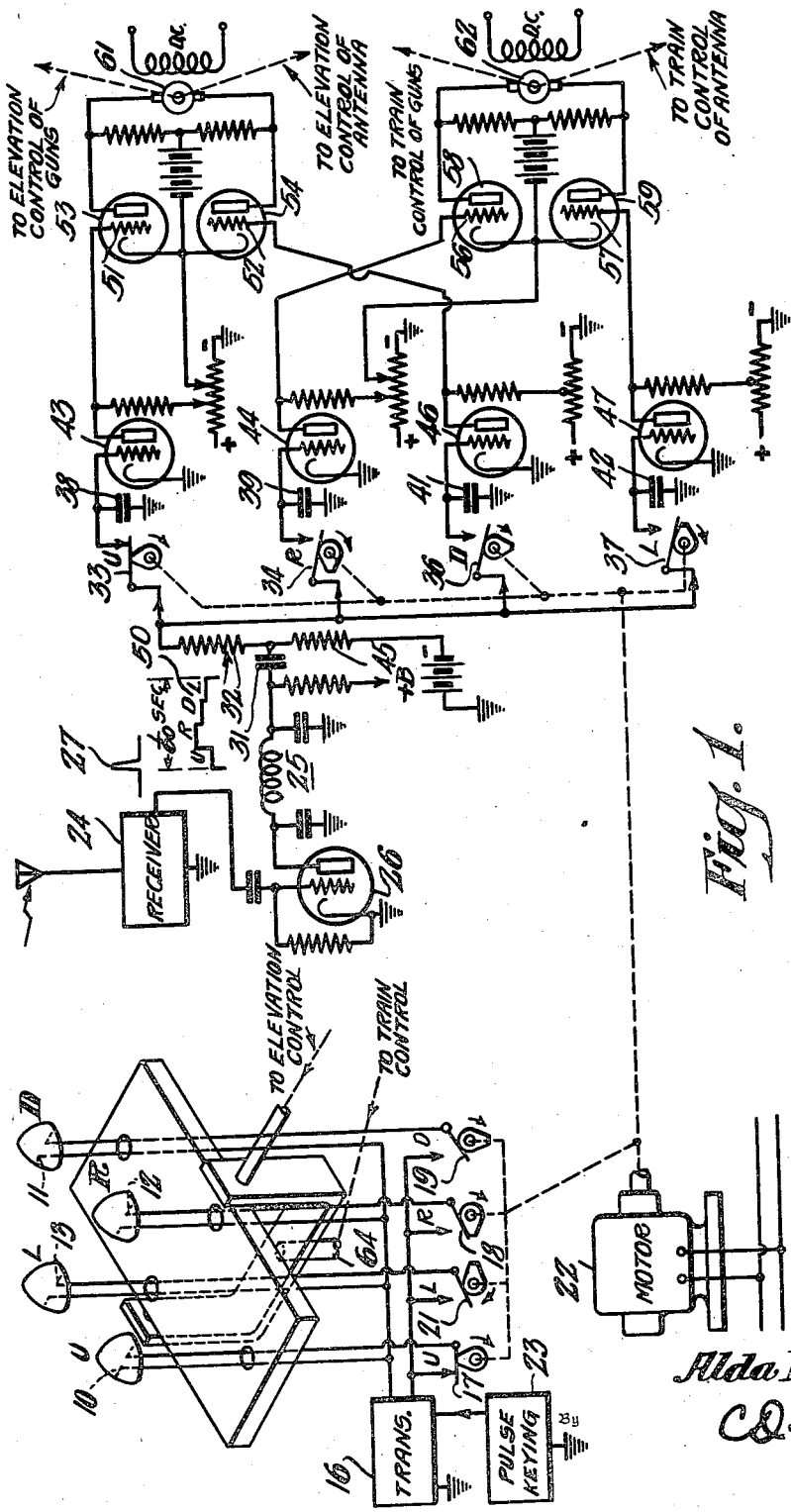

2,422,068

UNITED STATES PATENT OFFICE 2,422,068

PULSE ECHO CONTROL SYSTEM

Alda V. Bedford, Collingswood, N. J., assignor to Radio Corporation of America, a corporation of Delaware Application April 1, 1942, Serial No. 437,143

8 Claims. (Cl. 250—1.54)

1

My invention relates to pulse-echo systems and particularly to systems wherein an antenna system and/or guns or the like are moved automatically to a position determined by the location of an object relative to the radiation pattern of the antenna system. The invention will be described specifically as applied to a radio pulse-echo system wherein the transmitter radiates signals from antennas having overlapping directional radiation patterns.

An object of the invention is to provide an improved system of the above-mentioned type.

A further object of the invention is to provide an improved system for aiming guns at an object automatically in accordance with its location with respect to overlapping radiation patterns.

A still further object of the invention is to provide an improved system for producing control signals in accordance with the location of an object with respect to overlapping radiation patterns.

In a preferred embodiment, the invention is applied to a pulse-echo system having a directive antenna system so designed that its radiation pattern or patterns may be rotated in both a horizontal plane and a vertical plane to search for an object such as an enemy airplane. The antenna system may consist of four directive antennas which may be keyed successively, as described, for example, in application Serial No. 259,057, filed February 28, 1939, in the name of Irving Wolff, and entitled Object detection and location, or an antenna system may be employed which is keyed by means of shorting condensers as described and claimed in application Serial No. 412,943, filed September 30, 1941, in the name of George H. Brown and entitled Antenna systems.

In the receiver, control signals are derived from the received pulses that have been reflected from the target or other object. They may be obtained from a peak voltage measuring circuit that is switched in synchronism with the keying of the directive antennas. Thus, the control signals are determined by the relative amplitudes of the reflected pulses in the two horizontal radiation patterns and by the relative amplitudes of the reflected pulses in the two vertical radiation patterns. The switching circuit applies the up, down, right left pulses to four capacitors, respectively, which are connected to the control grids of four vacuum tubes whereby the pulses are stored in their respective capacitors to hold said control grids at the proper control potentials during the switching sequence. The vacuum tube output circuits are connected to suitable amplifier and motor control means for positioning the antenna system and/or the guns or other units to be controlled.

The invention will be better understood from the following description taken in connection with the accompanying drawing in which

2

Figure 1 is a circuit diagram of one of the preferred embodiments of my invention;

Figure 2 is a diagram of the radiation patterns of the directive antennas employed in the system of Fig. 1; and Figure 3 is a circuit and block diagram of another embodiment of my invention.

In the several figures like parts are indicated by the same reference characters.

Fig. 1 shows a radio pulse-echo system comprising four directive antennas 10, 11, 12 and 13 for radiating slightly upward, downward, to the right and to the left respectively with respect to a central common axis as indicated by the letters U, D, R and L. To simplify the drawing, these antennas are shown as dipoles having parabolic reflectors which are preferably located in a common vetrical plane although in the instant illustration for convenience they are located in a horizontal plane. The radiation patterns for these antennas are overlapping conical patterns of the character indicated in Fig. 2 where the patterns marked U, R, D and L correspond to the antennas similarly marked in Fig. 1. It is understood that the antenna radiation is greatest in the centers and weakens toward the edges of the cones. The antennas 10, 11, 12 and 13 may be like those illustrated in the above-mentioned Wolff or Brown applications, or of any suitable type, and in the particular system being described are mounted on a gimbal so that they may be moved to make their radiation patterns scan both horizontally and vertically.

High frequency radio pulses are supplied successively to the U, R, D and L antennas from a transmitter 16 through cam operated switches 17, 18, 19 and 21, respectively, driven by a motor 22. The said pulses are obtained by modulating the high frequency carrier wave produced at transmitter 16 by means of keying pulses from a source 23. The source 23 may be a multivibrator supplying pulses recurring at the rate of 4.1 kilocycles per second, for example.

The receiver 24 demodulates the reflected pulses of high frequency (4.1 kc. in the example assumed) energy to supply pulses 27 to a detector or rectifier 26 which preferably is of the peak rectifying type. In the circuit illustrated the rectifier 26 is a grid-leak biased peak rectifier tube which is well known in the television art. The output of rectifier 26 is passed through a low pass filter 25 and supplied through a large capacity blocking capacitor 31 and a resistor 32 and through cam operated switches 33, 34, 36 and 37 to capacitors 38, 39, 41 and 42, respectively. The output from the filter 25 is represented by the graph 50 where the four groups of filtered or integrated pulses of unequal amplitude are indicated at U, R, D, L.

The resistor 32 is provided to make the time constant of the capacitor circuits long enough to smooth out and substantially eliminate the effect of any high frequency noise pulses that may be received. Amplifier tubes 43, 44, 46 and 47 have their input electrodes connected across capacitors 38, 39, 41 and 42, respectively, whereby the voltage at the anode of each tube changes with any change in the charge on the capacitor in the grid circuit. A negative bias may be applied to the grids of tubes 43, 44, 46 and 47 through a grid leak resistor 45. The anodes of tubes 43 and 46 are connected in balanced or push-pull relation to the control grids 51 and 52, respectively, of a pair of amplifier tubes 53 and 54. The anodes of tubes 44 and 47 are connected in balanced relation to the control grids 56 and 57, respectively, of a pair of amplifier tubes 58 and 59.

The anode circuits of the two pairs of tubes 53—54 and 58—59 are connected in balanced relation to D.-C. motors 61 and 62, respectively, in the particular example illustrated. It will be apparent that these motors rotate in one direction or the other when the radiation pattern is off the target and stop when it is on the target. As indicated by the legends, motors 61 and 62 are mechanically coupled to the elevation controlling and train controlling shafts 63 and 64, respectively, of the antenna supporting gimbal whereby the antenna radiation pattern is made to follow automatically an airplane or other object. The motors 61 and 62 also control the elevation and train of one or more guns or search lights (not shown) whereby they are held on the airplane or other target automatically. This comprises a servo system.

The cam switches 33, 34, 36 and 37 are driven in synchronism with the antenna switches by the motor 22. Thus, in the diagram the "up" antenna switch 17 is closed, the corresponding "up" switch 33 of the control circuit is also closed, and all other switches are open. Next, as the cams are rotated, the switches 18 and 24 close, switches 17 and 33 open, and the other switches remain open. The switching sequence in this particular example is U, R, D, L as will be apparent from the shape of the cams and from the direction of rotation indicated by the arrows. The complete switching cycle may occupy 1/60 second, for example.

The particular graph shown at 50 represents a condition where the radiation pattern of the antenna system is not centered on the target. It will be noted that the reflected pulses during the interval U are of less amplitude than during the interval D, and that during the interval R they are of greater amplitude than during the interval L. During the time switch 33 is closed, the capacitor 38 is charged to a voltage equal to the peak voltage of the U group of reflected pulses; after switch 33 opens, capacitor 38 retains this charge. When switch 33 next closes, the condenser 38 either acquires more or loses some charge if the peak amplitude of the pulses has changed. Similarly, the other capacitors 39, 41 and 42 are charged by the received pulses so that the voltages thereacross correspond to the peak amplitudes of the pulses in groups R, D and L, respectively. The switches 33, 34, 36 and 37 preferably are timed to close shortly after the beginning of intervals U, R, D and L of graph 50, respectively, and to open shortly before the end thereof. It may be noted that the time scales for graphs 50 and 27 differ greatly, the pulse 27 actually being very short compared with the interval U, for instance.

One important feature of my system is that the transmitter radiation pattern can always be centered on a target regardless of reasonable variations due to fading and the like in the incoming signal strength since such variations will produce the same percentage change in all the voltages applied to the grids of tubes 43, 44, 46 and 47. Another important feature of the invention is that the system is not affected much by noise signals because the capacity of the capacitors 38, 39, 41 and 42 is so large that their charge is changed a negligible amount by such signals. Expressed another way, the capacitors reduce the noise by reducing the net band width of the signal used. However the time constant must not be made too long or hunting of the servo system may occur due to the delay of the signal.

It may be noted that while the use of a peak rectifier such as rectifier 26 is preferred, it is possible to employ other rectifiers such as one having an output that is a measure of the area of power of a pulse. While the use of the rectifier 26 and filter 25 is desirable, it should be understood that they may be omitted and the pulses 27 applied directly to the switch-capacitor units 33—38, 34—39, etc., providing the pulses are of sufficient amplitude to drive the grids of tubes 43, 44, 46 and 47 positive to cause grid rectification.

Fig. 3 illustrates how electrical keying may be substituted for the mechanical keying or switching performed by switches 33, 34, 36 and 37 of Fig. 1. In place of the switch 33 and its associated cam, for example, there may be substituted a bridge circuit 70 comprising diodes 71, 72, 73 and 74. Keying pulses may be derived from a 60 cycle power line 76 by means of a phase shifter 77 and a suitable wave shaping or clipping circuit 78. The keying pulses are applied to a transformer 79 at time intervals corresponding to the closing of switch 33 in the embodiment of Fig. 1 and across one bridge diagonal through a biasing resistor 81 shunted by a capacitor 82. Between keying pulses there is a bias voltage across elements 81—82 sufficient to prevent current flow through the diodes from the resistor 32 to the capacitor 38. During the keying pulse, however, current may flow through the bridge and the capacitor 38 may either acquire or lose some charge.

The charges on the other capacitors 39, 41 and 42 may be controlled in a similar way. Only two of the switching circuits are shown in Fig. 3 since they all may be alike, the other two being omitted to simplify the drawing. The switching circuit illustrated for capacitor 39 comprises a phase shifter 83, a clipper circuit 84, and a keying bridge 86.

It should be understood that the invention is not limited to a system employing four radiation patterns as it is equally applicable, for example, to a system having only left-right control or indication. Also, the radiation patterns may be produced by sound or light radiation, for example, rather than by radiation of radio signals, my capacitor-switching receiving systems being equally applicable to all such systems.

I claim as my invention:

1. In a servo system, means for transmitting pulses from an assembly of directive radiation means for radiating successively overlapping radiation patterns, means for receiving said pulses after reflection from an echo source, said radiation patterns having characteristics such that the received signal differs in strength for the successive radiations in accordance with the displacement of the assembly of the radiation means with respect to the source of the echoes, a plurality of capacitors, switching means synchronized with the transmitting and receiving means for charging each capacitor in accordance with the received signal during the interval of transmission by radiation in each of said patterns, respectively, and utilizing means for driving a motor backward or forward in accordance with the difference in the voltages across said capacitors, and means whereby said motor turns said assembly of radiators toward said source of echoes.

2. In a servo system, means for transmitting pulses from an assembly of directive radiation means for radiating two overlapping radiation patterns alternately, means for receiving said pulses after reflection from an echo source, said radiation means being so designed that the received signal differs in strength for the alternate radiations in accordance with the displacement of the assembly of the radiation means with respect to the source of the echoes, two capacitors, switching means synchronized with the transmitting and receiving means for charging one capacitor in accordance with the received signal during the intervals of transmission by radiation in one of said patterns, means for charging the other capacitor in accordance with the received signal during the intervals of transmission by radiation in the other of said patterns, and utilizing means for driving a motor backward or forward in accordance with the difference in the voltages across said capacitors, and means whereby said motor turns said assembly of radiators toward said source of echoes.

3. In a servo system, means for transmitting pulses and receiving echoes alternately for short intervals from an assembly of two directive radiators, said radiators being assembled so the received signal differs in strength for the two intervals in accordance with the displacement of the assembly of radiators with respect to the source of the echoes, two capacitors, switching means synchronized with the transmitting and receiving means for charging one capacitor in accordance with the received signal during the intervals of transmission with one of the radiators, means for charging the other capacitor in accordance with the received signal during the intervals of transmission with the other radiator, and utilizing means for driving a motor backward or forward in accordance with the difference in the voltages across said condensers, and means whereby said motor turns said assembly of radiators toward said source of echoes.

4. In a system wherein a plurality of groups of pulses are received successively, a plurality of vacuum tubes each having a capacitor connected across its input electrodes, a plurality of switching means associated with each of said capacitors, respectively, means for passing direct current pulses representative of said groups of pulses through said switching means sequentially to charge said capacitors, and means for making said switching means effective to pass current to said capacitors synchronously with the reception of said groups of pulses.

5. In a receiver for receiving reflected pulses in a system wherein pulses of energy are transmitted in overlapping radiation patterns, each pattern including a group of pulses, the said radiation patterns being radiated in succession, means for obtaining D.-C. energy from said reflected pulses, a pair of vacuum tubes, each having input electrodes connected across a capacitor, means for connecting said first means successively to the input electrodes of said vacuum tubes and in synchronism with the radiation of said patterns, respectively, to obtain two D.-C. output voltages from said vacuum tubes which voltages are a measure of the amplitude of said two groups of reflected pulses, and means for applying said D.-C. voltages to control devices.

6. In a receiver for receiving reflected pulses in a system wherein radio pulses are transmitted from directive antennas having overlapping radiation patterns, each pattern including a group of pulses, the said radiation patterns being radiated in succession, means for demodulating the received pulses, a pair of vacuum tubes, each having input electrodes connected across a capacitor, means for connecting said demodulating means successively to the input electrodes of said vacuum tubes and in synchronism with the radiation of said patterns, respectively, to obtain two D.-C. output voltages from said vacuum tubes which voltages are a measure of the amplitude of said two groups of reflected pulses, and means for applying said D.-C. voltages to control devices.

7. In a radio pulse-echo system, a plurality of directive antennas having overlapping radiation patterns in the horizontal plane and having overlapping radiation patterns in the vertical plane, each pattern including a group of pulses, a radio pulse transmitter, means for switching said antennas successively to said transmitter, a receiver, means for obtaining two D.-C. voltages which are a measure of the amplitude of the two groups of reflected pulses in the horizontal plane, two capacitors for storing said two D.-C. voltages, respectively, means for obtaining two D.-C. voltages which are a measure of the aplitude of the two groups of reflected pulses in the vertical plane, two capacitors for storing said last two D.-C. voltages, respectively, and switching means operated in synchronism with said antenna switching for applying said two first-mentioned D.-C. voltages to the first two capacitors, respectively, and for applying said two last-mentioned D.-C. voltages to the last two capacitors, respectively.

8. In a servo system, means for transmitting pulses and for receiving them after reflection from an echo source, said means including an assembly of directive antennas having overlapping radiation patterns which are effective successively to supply signal to a receiving means, said radiation patterns having characteristics such that the received signal differs in strength for the successive radiation patterns in accordance with the displacement of the assembly of directive antennas with respect to the source of the echoes, a plurality of capacitors, switching means synchronized with the antenna assembly and receiving means for charging each capacitor in accordance with the received signal during the interval that a radiation pattern is effective to supply signal to the receiving means, respectively, and utilizing means for driving a motor backward or forward in accordance with the difference in the voltages across said capacitors, and means whereby said motor turns said assembly of antennas toward said source of echoes.

ALDA V. BEDFORD.